Figure 1:
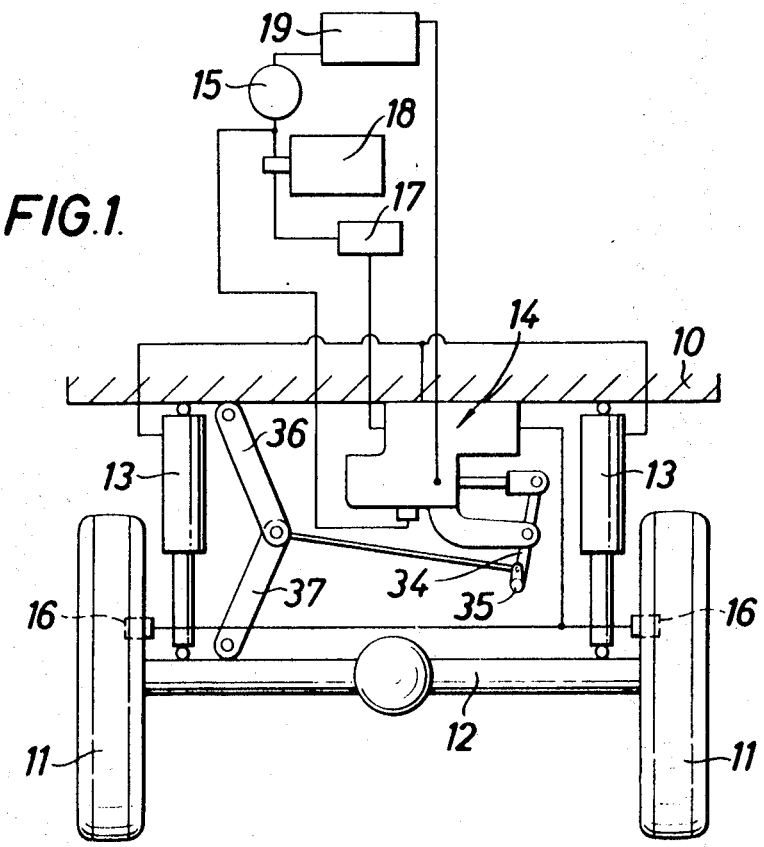

United States Patent

[11] 3,612,623

[72] Inventor Leslie C. Chouings
     Leamington Spa, England
[21] Appl. No. 859,885
[22] Filed Sept. 22, 1969
[45] Patented Oct. 12, 1971
[73] Assignee Automotive Products Company Limited
     Leamington Spa, Warwickshire, England
[32] Priority Sept. 23, 1968
[33] Great Britain
[31] 45123/68

[54] VALVE MEANS FOR LIQUID PRESSURE SYSTEMS
     2 Claims, 2 Drawing Figs.
[52] U.S. Cl. ................................................. 303/22 A,
     188/195, 303/10, 280/124
[51] Int. Cl. ................................................. B60t 8/18
[50] Field of Search .......................................... 280/124;
     303/22, 22 A, 6, 6 C, 10; 188/195

[56] References Cited
UNITED STATES PATENTS
3,475,059  10/1969  Klein ............................ 303/22

Primary Examiner—Milton Buchler
Assistant Examiner—John J. McLaughlin
Attorney—Lawrence J. Winter ABSTRACT: A valve device for use in a liquid pressure system on a vehicle to maintain the vehicle structure at a substantially constant level despite changes in the load carried thereby includes a valve spool activated by any tendency for the vehicle structure to rise or drop due to load changes to vary the liquid pressure in liquid filled struts supporting the said structure, the changes in liquid pressure also acting on a valve controlling the flow of liquid from a braking pressure source to brake motor cylinders, to provide a limit to the brake applying pressure acting in the motor cylinders which limit varies with the vehicle loading.

PATENTED OCT 12 1971 3,612,623

INVENTOR
BY
ATTORNEY

VALVE MEANS FOR LIQUID PRESSURE SYSTEMS

This invention relates to valve means for liquid pressure systems employed on vehicles. Liquid pressure braking systems for vehicles are well known, and it has been proposed to provide liquid pressure systems in connection with the suspension of vehicles to maintain the vehicle body at a substantially constant level despite variations of the static load carried thereby and variations of load distribution due to acceleration and deceleration.

It has also been proposed to control the degree of braking on wheels of a vehicle in accordance with the load carried by the said wheels, so that the degree of braking increases with increasing load to take advantage of the greater adhesion provided by the greater load without providing too great a degree of braking when the load is light.

It is the object of the present invention to provide a valve for controlling the liquid pressure in struts or like members through which the weight of the vehicle is transmitted to the wheels an acting in response to variations in the said liquid pressure to vary the degree of braking applied to the said wheels.

According to the invention, valve means for the purpose set forth comprises a valve body adapted for mounting on a vehicle structure, a first valve device in said valve body including a valve spool slidable in a valve bore and adapted to be connected through resilient means to an axle or wheel mounting of the vehicle so as to be moved in the valve bore by relative vertical displacement of the vehicle structure and the axle or wheel mounting, said valve spool being arranged to control connections between a liquid-filled strut or struts arranged between a vehicle structure on which the valve body is mounted and an axle or wheel mounting to which the valve spool is connected, so as to support at least a part of the weight of the vehicle carried by said axle or wheel mounting and a source of pressure and a drain, and to trap liquid in said strut or struts at a pressure so related to the weight supported by said strut or struts that the vehicle structure is supported at a predetermined level, said valve means also including a second valve device comprising a valve member slidable in a second valve bore and adapted to control flow of liquid in a liquid pressure braking system between a source of liquid pressure and motor cylinders actuating brakes on a wheel or wheels carried by said wheel mounting or axle and the valve member of said second valve device being arranged to be urged in a valve opening direction by the liquid pressure acting in said strut or struts and in the closing direction by the liquid pressure acting in said motor cylinders.

Preferably, the second valve device is mounted in the same valve body as the first valve device.

Figure 2:
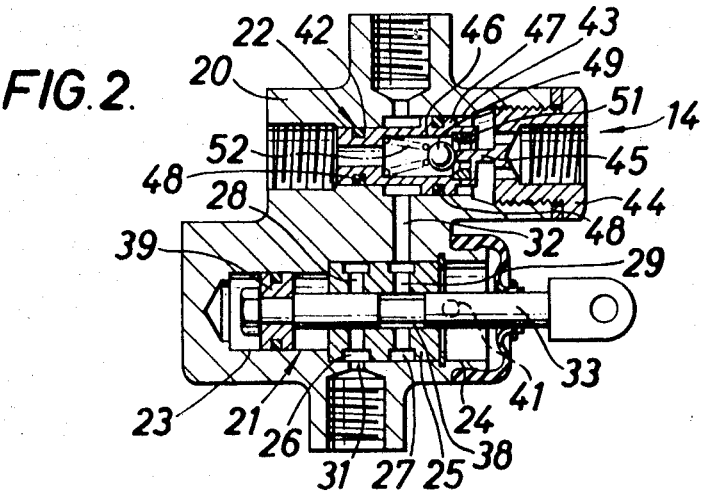

One form of valve means according to the invention will now be described, by way of example, with reference to the accompanying drawing, in which:

FIG. 1 is a diagram showing a liquid pressure system for operating the brakes and controlling the level of a vehicle body; and FIG. 2 is a sectional elevation of a valve according to the invention for incorporation in the system shown in FIG. 1.

Referring first to FIG. 1 of the drawings, a vehicle structure is indicated at 10, and two wheels of the vehicle at 11, the wheels being mounted on an axle 12 from which the vehicle structure is supported by any convenient form of suspension system (not shown). Liquid filled struts 13, which are arranged in series with resilient elements (not shown) of the suspension system, are arranged to be connected through a valve unit 14 to a source of liquid pressure (pump 15) so that a pressure can be maintained therein to support the vehicle structure at a substantially constant mean level despite variations of the load supported by the wheels.

Brakes (not shown) on the wheels 11 are arranged to be applied by liquid pressure acting in motor cylinders 16, liquid pressure being caused to act in the said motor cylinders 16 by operation of a driver's valve 17 which controls liquid pressure supplied from an accumulator 18 in which pressure is maintained by the pump 15. Liquid supplied to the motor cylinders 16 from the driver's valve 17 passes through the valve unit 14 as will be hereinafter described. The pump 15 draws liquid from a reservoir 19.

Referring now to FIG. 2 of the drawings, a valve body 20, adapted for mounting on the body structure 10 so as to move therewith relative to the vehicle wheels is formed with two parallel bores 21 and 22. The bore 21 is closed at one end, and is stepped intermediate its ends to provide a smaller-diameter portion 23 adjacent its closed end and a larger-diameter portion 24 adjacent its open end. A sleeve 25 mounted in the bore portion 24 and having an internal diameter less than that of the bore portion 23 is formed externally with two longitudinally spaced circumferential grooves 26 and 27 connected respectively by radial drillings 28 and 29 to the bore of the sleeve 25. The sleeve 25 is held by a clip ring against the step in the bore 21, and the circumferential groove 26 therein registers with a passage 31 in the valve body 20 to which is connected a liquid pressure supply source such as the pump 15. The circumferential groove 27 registers with a passage 32 in the valve body which intersects the bore 22 and is connected to the liquid-filled struts 13 through which the weight of the vehicle body is transmitted to the axle 12.

A valve spool 33 slidable in the bore of the sleeve 25 projects from the open end of the bore 21 and is connected to a suitable linkage (FIG. 1), including a lever 34 pivoted to a bracket on the valve body 20, a torsion bar 35 which is connected at one end to the end of the lever 35 remote from the valve spool 33 and at its other end to one end of a link which is pivotally connected at its other end to the pivotal interconnection between a pair of limbs 36, 37 which are pivotally connected to the vehicle structure 10 and to the axle 12 respectively, so that the position of the valve spool 33 in the bore depends on the vertical distance between the vehicle body and the axle, the torsion bar 35 tending to absorb rapid relative movements of the vehicle body and axle so that the valve spool 33 tends to respond only to relatively slow relative movements.

The valve spool 33 is formed with a circumferential groove 38 which is in constant communication through the drillings 29 with the passage 32 and the said valve spool carries, in the bore portion 23, a piston 39 providing a dashpot action to damp the movements of the spool. Downward movement of the vehicle body relative to the axle or wheel mounting tends to move the spool 33 towards the closed end of the bore 21 until the groove 38 connects the passage 32 to the passage 31, thus connecting the struts 13 to the pump 15 and enabling liquid to be fed into the said struts to raise the vehicle body until the latter is restored to its normal level. Upward movement of the vehicle body from its normal level tends to move the valve spool 33 towards the open end of the bore 21 until the groove 38 opens into the bore portion 24 beyond the sleeve 25 and connects the passage 32 to drain port 41 communicating with that bore portion and leading to the reservoir 19. The vehicle body is thus allowed to move downwardly relative to the wheels until, when the normal level is reached, the groove 38 is again closed by the sleeve 25. Thus the liquid pressure in the passage 32 which corresponds to the liquid pressure in the struts, is a measure of the load carried by the vehicle.

The bore 22 is also stepped to provide a portion 42 at one end of smaller diameter and a portion 43 at the other end of larger diameter, the passage 32 intersecting the portion 43 of the said bore adjacent the step. The end of the bore portion 42 is connected to the driver's control valve 17. A plug 44 closing the end of the bore portion 43 is formed with apertures to allow liquid from that end of the bore 22 to pass to the liquid pressure motor cylinders 16, the pressure in which is controlled by the valve means. A pin 45 carried by the plug 44 projects into the bore portion 43 for a purpose hereinafter described.

A tubular plunger 46 slidable in the bore 22 has one end thereof fitting slidably in the bore portion 42, and has an enlargement 47 fitting slidably in the bore portion 43, packing rings 48 being provided on the said enlargement 47 and on the smaller end of the plunger 46 within the bore portion 42. A ball 49, urged towards a seat 51 in the bore of the tubular plunger 46 by a spring 52, is held off the said seat under certain conditions by the pin 45 to provide a free passage through the bore 22 for liquid in the braking system.

It will be observed that liquid pressure acting in the motor cylinders 16 of the braking system will act on the full area of the plunger 46 exposed in the bore portion 43, and liquid pressure acting in the struts 13 will act on the annular area of the plunger 46 facing the step in the bore 22. Thus, for any given liquid pressure acting in the struts there will be a value of liquid pressure acting in the brake motor cylinders at which the said last-mentioned liquid pressure will be sufficient to move the plunger towards the smaller diameter bore portion 42, allowing the ball 49 to seat and prevent further increase of pressure in the brake motor cylinders 16. Thus the maximum degree of braking which can be obtained depends on the liquid pressure in the struts 13, and so depends on the loading of the vehicle. It will be evident that the valve means according to the invention will respond not only to static load changes, but to dynamic load changes due to acceleration or deceleration of the vehicle.

The struts 13, instead of being arranged in series with resilient elements of the suspension system and wholly supporting the weight of the vehicle, may be arranged in parallel with resilient suspension means which support a part of the said weight, the struts being (for example) mounted within the inner diameter of coil springs providing the resilient suspension. With such an arrangement, the valve means according to the invention is modified by the inclusion of a spring acting on the plunger 46 in a direction to cause unseating of the ball 49. The proportion of the total opening effort provided by this spring is the same as the proportion of the vehicle weight supported by the associated strut and suspension spring which is supported by that suspension spring.

Whilst the diagram (FIG. 1) shows a pair of wheels 11 mounted on an axle 12, the valve according to the invention may be utilized in vehicles having independent suspension means associated with each wheel thereof, the linkage 34, 35, 36, 37 being arranged between the vehicle structure and a wheel support carrying one of the wheels.

It will be understood that the linkage 34, 35, 36, 37 is shown in diagrammatic form, and the actual arrangement of the linkage may differ substantially from that shown in FIG. 1. Furthermore, it will be understood that any other suitable resilient link may be utilized in place of the torsion bar 35.

I claim:

1. A brake regulator system for a vehicle having a chassis with an axle and wheel mounted thereon, a hydraulic load leveling strut member connecting said chassis with said axle, a hydraulic brake motor cylinder for said wheel, a source of liquid pressure and liquid conduits in communication with said source of liquid pressure and strut member and said motor cylinder, and a control valve device secured to said chassis and disposed in said conduits between said liquid pressure source and strut member and motor cylinder comprising a housing with a first bore and a slidable valve spool therein to control the supply of liquid between said strut member and liquid source, said valve spool extending out of said bore and having a linkage means connecting it to said chassis and axle, drain port means in said bore for receiving liquid from said strut member, said linkage means being operatively connected to said spool and chassis to place said strut member and liquid source in communication with each other when said chassis moves downwardly toward said axle, and to place said strut member in communication with said drain means when said chassis moves upwardly away from said axle, and an internally stepped bore in said device in communication with said strut member and said motor cylinder and having a passage in communication with said first-mentioned bore, an externally stepped tubular plunger in said stepped bore and being disposed therein so the liquid in said strut member acts on the annular area of said stepped plunger, a valve seat in said plunger with a ball valve seated thereon, biasing means urging said ball valve seated, a plug member on said stepped bore adjacent its end in communication with said motor cylinder having a pin extending therefrom toward said ball valve adapted to unseat it when the liquid pressure thrust in said strut member acting in one direction on said annular area exceeds the liquid pressure thrust acting in the motor cylinder against said plunger.

2. The system of claim 1 wherein liquid damping means are provided in said first-mentioned bore to damp the movements of said valve spool.